United States Patent
Viegener

(10) Patent No.: US 6,427,309 B1
(45) Date of Patent: Aug. 6, 2002

(54) METHOD AND FORMING ELEMENT FOR PRODUCING A PRESS CONNECTION BETWEEN A FITTING AND A PIPE AND BEING INSERTED INTO THE RECEPTION OF THE FITTING

(75) Inventor: Walter Viegener, Attendorn (DE)

(73) Assignee: Franz Viegener II GmbH & Co. KG, Attendorn (DE)

( * ) Notice: Subject to any disclaimer, the term of this patent is extended or adjusted under 35 U.S.C. 154(b) by 56 days.

(21) Appl. No.: 09/634,758

(22) Filed: Aug. 8, 2000

(30) Foreign Application Priority Data

Aug. 17, 1999 (EP) .............................. 99116085

(51) Int. Cl.[7] .............................................. B23P 11/02
(52) U.S. Cl. ............................ 29/450; 29/516; 285/379
(58) Field of Search .......................... 29/450, 451, 235, 29/516; 277/314, 615; 285/379, 380, 374

(56) References Cited

U.S. PATENT DOCUMENTS

| | | | |
|---|---|---|---|
| 2,738,992 A | * | 3/1956 | Heisler |
| 3,436,085 A | * | 4/1969 | Polk |
| 3,775,822 A | * | 12/1973 | Forni ............................ 29/450 |
| 3,947,944 A | * | 4/1976 | Washington ................. 29/450 |
| 3,979,130 A | * | 9/1976 | Cowie |
| 4,191,384 A | * | 3/1980 | Svedberg ..................... 29/451 |
| 4,362,323 A | * | 12/1982 | Lodder et al. |
| 4,368,894 A | * | 1/1983 | Parmann ...................... 29/451 |
| 4,576,403 A | * | 3/1986 | Burkholder |
| 4,606,559 A | * | 8/1986 | Rammelsberg |

FOREIGN PATENT DOCUMENTS

| | | |
|---|---|---|
| DE | WO 98/11377 | 3/1998 |
| EP | 0 343 395 A2 | 11/1989 |
| EP | 0 343 395 B1 | 11/1989 |
| EP | 0 348 395 A3 | 11/1989 |
| EP | 0 870 964 A1 | 10/1998 |

* cited by examiner

Primary Examiner—David P. Bryant
Assistant Examiner—Steven A Blount
(74) Attorney, Agent, or Firm—Barnes & Thornburg

(57) ABSTRACT

Method of forming a compression coupling between a fitting and a tube inserted into the retaining section of the fitting. The method involves use of a shaped part formed so that, during insertion of the tube into the fitting, the sealing ring set into an annular retaining groove of the fitting is not damaged by the sharp, outer edges at the front end surface of the tube. Before or during the insertion of the tube into the fitting, the sealing ring is elastically outwardly deformed from the inner contours by means of at least one installed shaped part. The tube end is then inserted up to a contact surface, which forms the interior boundary of the retaining section of the fitting. There upon, the parts are pressed together by cold deformation of the parts. The method and the shaped parts are installed preferably in sanitary engineering and are used wherever liquids or gaseous media are carried through tubes.

19 Claims, 6 Drawing Sheets

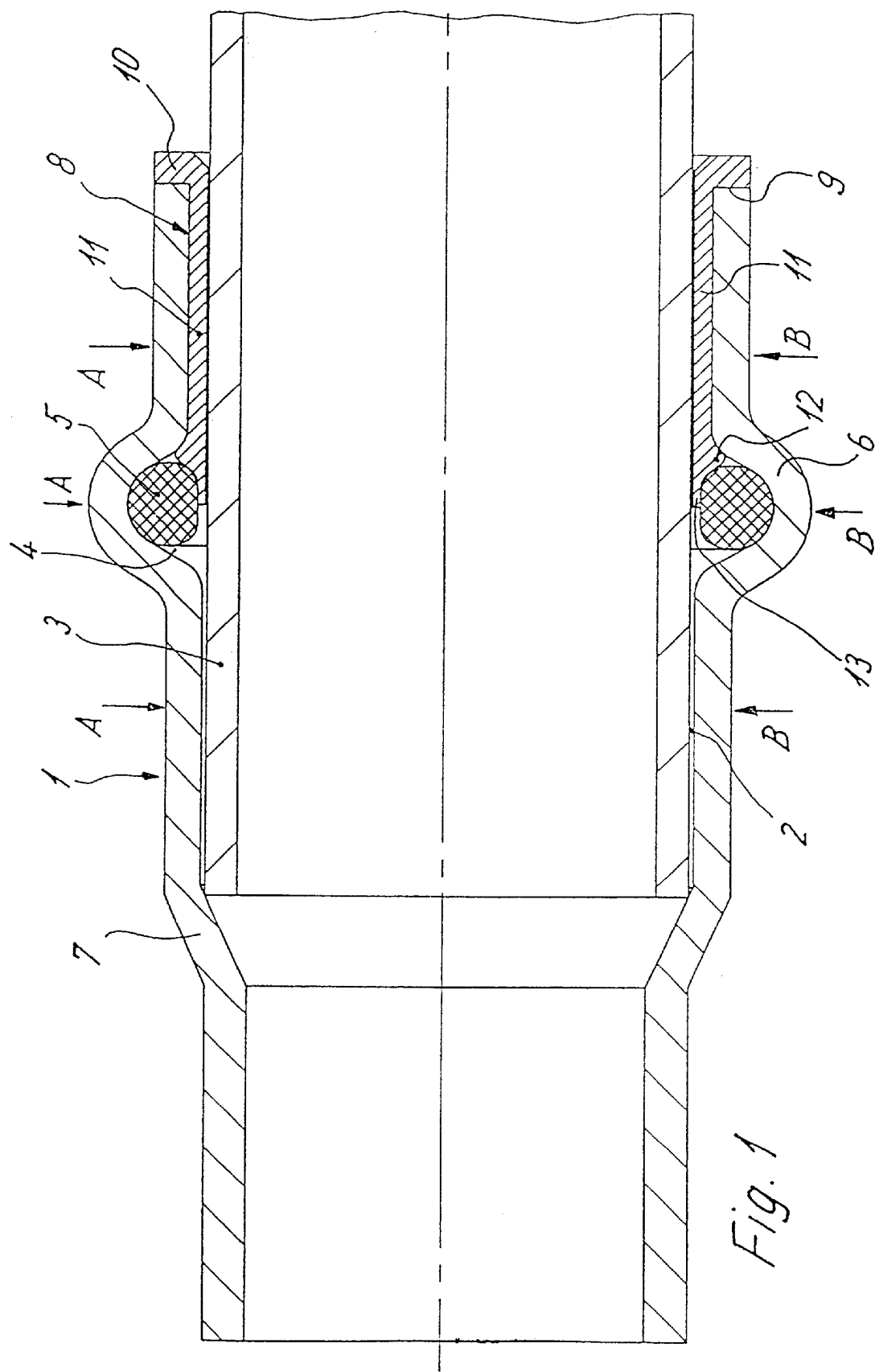

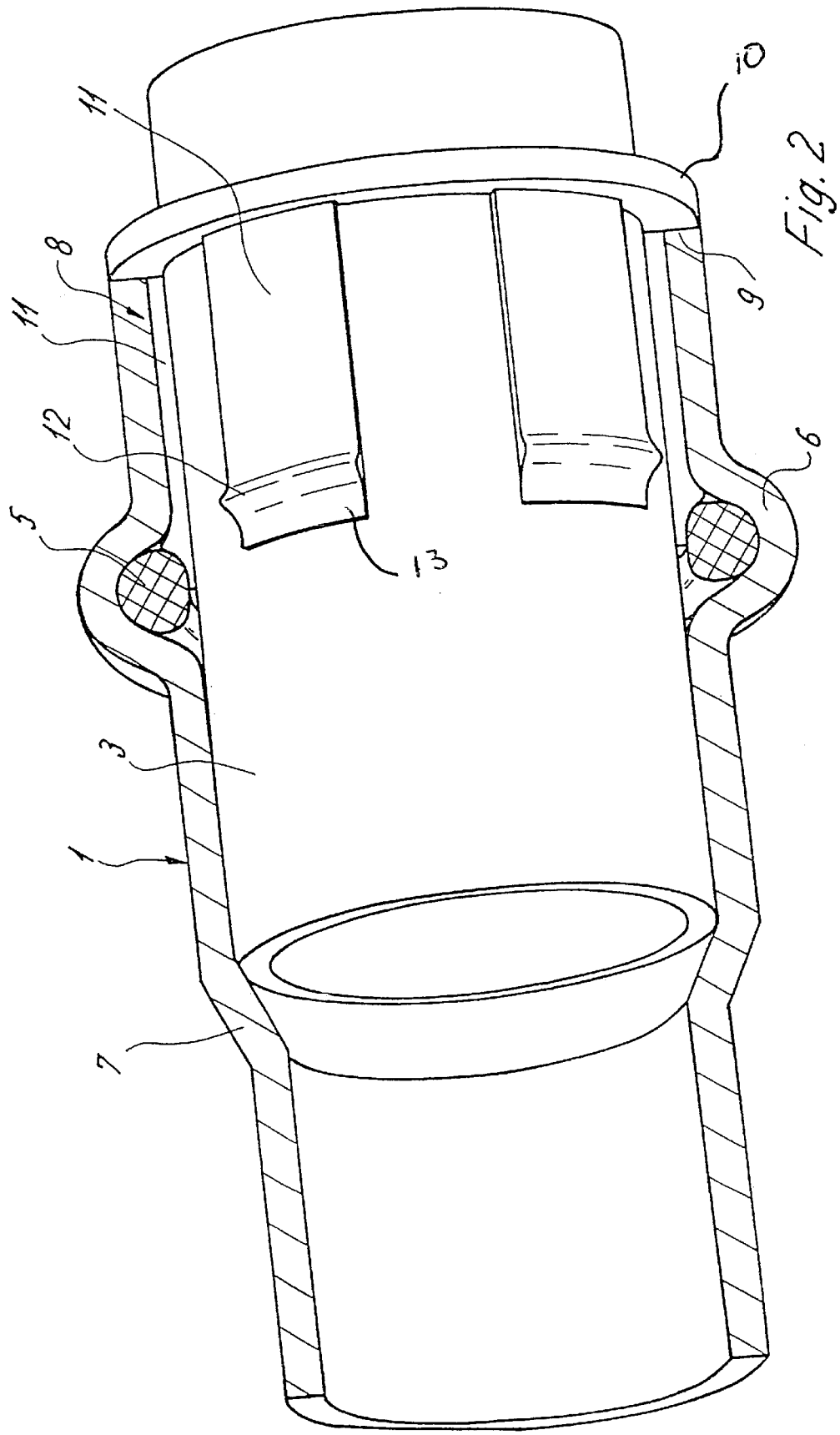

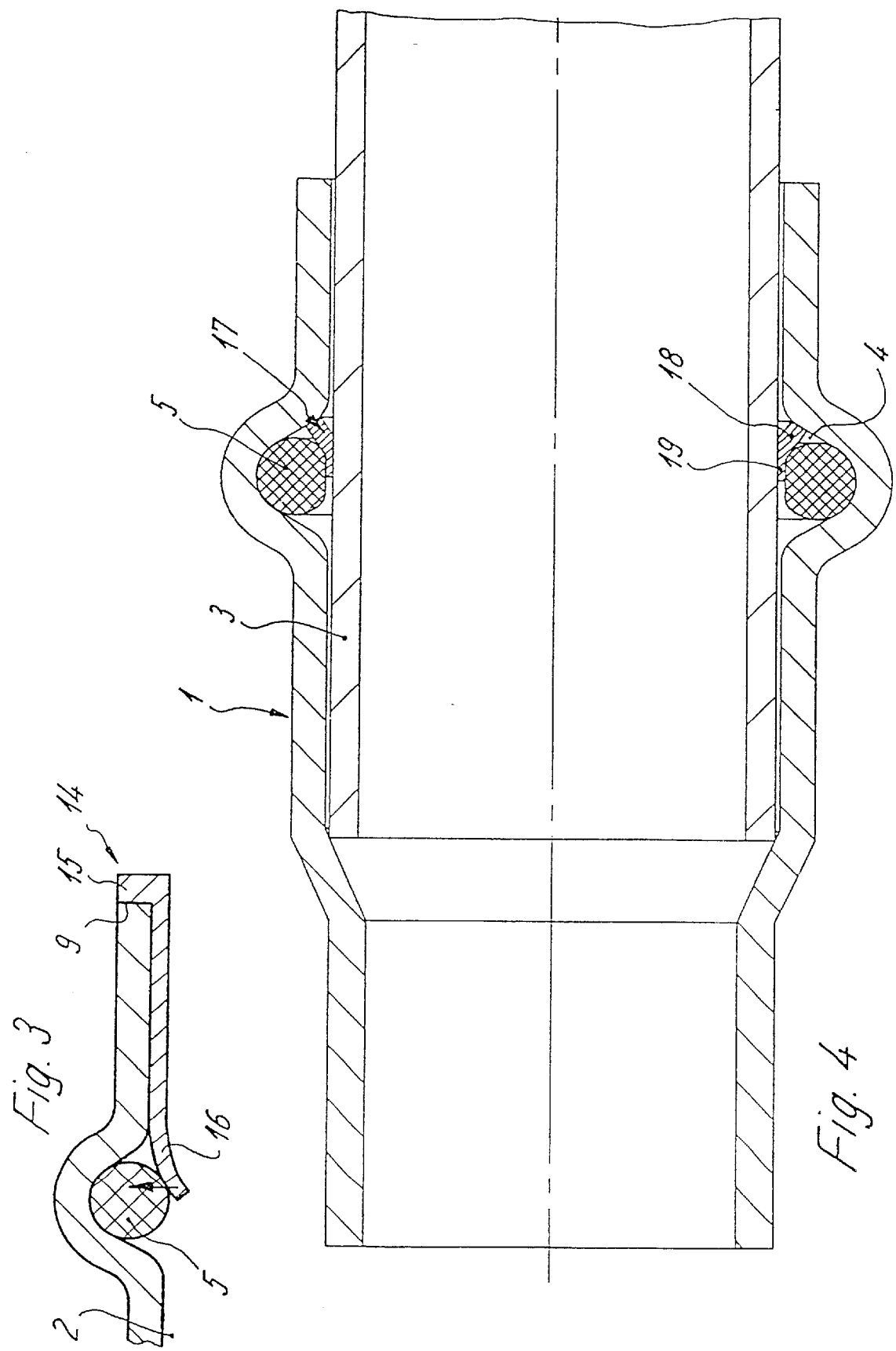

METHOD AND FORMING ELEMENT FOR PRODUCING A PRESS CONNECTION BETWEEN A FITTING AND A PIPE AND BEING INSERTED INTO THE RECEPTION OF THE FITTING

BACKGROUND OF THE INVENTION

The invention pertains to a method of forming a compression coupling between the connecting piece of a fitting and a tube inserted into the retaining section of the fitting up to its mating edge, where a pressing tool is used in the region of an annular bulge of the fitting in which a sealing ring is seated.

The invention also pertains to a shaped part inserted into the retaining section of the fitting during implementation of the method.

It is known in the art to couple tubes together using cold deformation. Tubes to be coupled together generally have a retaining section at one end and a narrower section at the other, enabling one tube to be inserted into another. For the purpose of clarity, one tube will be called a fitting, and the other a tube.

Before the tube is inserted into the fitting, the sealing ring is installed in an interior, open retaining groove which is formed by a toroidal deformation of the fitting. After the insertion of the tube into the fitting, the sealing ring fits around and engages the exterior of the tube.

Frequently, the ends of tubes end have sharp edges, such as burrs formed during the manufacture or cutting of the tubes. These sharp edges expose the sealing ring to the risk of damage during insertion, which of course adversely affects the seal.

The invention addresses the problem the described above, so that upon insertion of a tube into a fitting, the sealing ring within the annular retaining groove will not be damaged by the sharp, outside edges on the leading end of the tube. Thus, when the parts to be joined are pressed together, the necessary tight seal will be achieved.

SUMMARY OF THE INVENTION

The invention addresses these problems existing in the prior art, in that before or during the insertion of the tube into the fitting, the sealing ring is elastically deformed from the inner contours by means of at least one engaged shaped part. The tube is inserted up to the mating edge and cold deformation is performed on the parts to be joined.

In the inventive method, one or more shaped parts are introduced into the retaining section of the fitting before, during or after insertion of the sealing ring, so that the sealing ring is forced away from the entry path of tube. Any sharp edges on the leading end of the tube which can possibly be part of an unremoved burr, cannot come into contact with the sealing ring.

Tubes that are joined with the fitting by means of cold deformation generally include metal tubing, which can be made of stainless steel or copper, for example. Plastic tubes and composite tubes are also possible; this method would work equally well with these and other tubes as well.

The shaped parts installed in the retaining section of the fitting or into the retaining groove of the sealing ring are preferably made of plastic. Different materials that satisfy the requirement are also possible.

The invention is a method of creating a compression coupling between a fitting and a tube. The fitting has a retaining region near an end portion of the fitting. The retaining region has an interior-oriented annular groove cooperatively formed with an exterior-oriented annular bulge on the retaining region. The tube has an end formed to fit into the retaining region of the fitting. The method comprising the steps of positioning a sealing ring in the groove, inserting a shaped part into the fitting to engage and radially outwardly deform the sealing ring to provide clearance between the sealing ring and the tube when the tube is installed into the fitting, installing the tube into the fitting, and pressing the retaining region onto the tube.

The method may also comprise the step of providing a shaped part that enters the groove to engage a middle region of the sealing ring. Additionally, the shaped part may comprise at least one of annular segments, casings, wedges, or stems.

In one embodiment, the shaped part is a casing formed to fit around the end of the tube and define a hollow interior. The casing has an inwardly-extending flange adjacent a first end and an outwardly-extending flange adjacent a second end, and a predetermined annular breaking region therebetween. The method using the casing involves the steps of inserting the end of the tube into the second end of the casing, and inserting the first end of casing into the fitting until the inwardly-extending flange engages an end of the tube and the outwardly extending flange engages an end of the fitting. The breaking region fails during this step, breaking the casing into two parts at the breaking region aligned with the sealing ring to form a separation by continued insertion. Preferably, the breaking region has a width that corresponds to the width of the sealing ring, and the sealing ring is pressed along all or part of entire width of the breaking region.

When the method is properly performed using the casing embodiment or any other embodiment, the seal elastically deforms during the pressing step such that approximately half of the sealing ring engages an exterior surface of the tube.

In another embodiment, the shaped part is formed to enter the groove and push the retaining ring into the groove and out of the interior of the retaining region.

In another embodiment, the shaping part comprises a ring shaped angular flange formed to engage a front surface of the fitting, and at least one segment extending inwardly from the annular flange. Each segment has a raised edge formed thereon adjacent an end distal the flange. A thin walled tongue is formed extending from each raised edge. Incorporating this embodiment into the claimed method, the raised edges engage a portion of the groove during the insertion step, and thin walled tongues extend approximately halfway past the sealing ring. In this embodiment, each annular segment will simultaneously engage the interior of the retaining region as well as the exterior of the tube during the installing step.

In another embodiment, the method may incorporate a shaping part comprising a ring shaped annular flange formed to engage a front surface of the fitting, and at least one stem formed so that an end of the stem engages an inner contour of the sealing ring during the inserting step. In this embodiment, the stem and the sealing ring are cooperatively formed so as to force the sealing ring into the groove during the inserting step and out of the path of the tube during the installing step.

In another embodiment, the method may incorporate a shaped part comprising a split ring having two legs, which in cross-section form an acute angle. A first leg is formed to engage an inner contour of the retaining ring, and a second leg will pass between the retaining ring and the groove. Preferably, the second leg may comprise annular segments.

In another embodiment, the method may incorporate a shaped part comprising a split clamping ring formed to installed within the groove, thereby pressing the sealing ring outwardly into the groove during the inserting step. Alternatively, the shaped part may comprise a split molded ring with an angular cross-section having a first leg braced against the sealing ring, and a second leg extending into an interior of the retaining region during the insertion step. In this embodiment, the second leg elastically deforms during the installing step.

In yet another embodiment, the method may include the step of inserting split rings within the groove so as to be positioned on both sides of the sealing ring.

The shaped part may be formed to have a predetermined break region defined by a thin, annular wall. The break region forms side contact surfaces which engage the sealing ring following the deformation that occurs during the pressing step. Specifically, the casing embodiment of the shaped part may comprise two parts that are joined together by the predetermined break region whose width corresponds to the width of the sealing ring. In another embodiment, the casing may comprise an outwardly protruding annular flange formed to engage an end of the fitting upon completion of the installment step.

Additionally, the annular flange may comprise a pin oriented in an axial direction. During the installing step, the pin is formed to engage the fitting upon the failure of the break region. Upon completion of the installing step, however, the pin bends radially outward.

Other objects, advantages and novel features of the present invention will become apparent from the following detailed description of the invention when considered in conjunction with the accompanying drawings.

BRIEF DESCRIPTION OF THE DRAWINGS

FIG. 1 shows a cross section view of a coupling before the pressing step according to the principles of the present invention.

FIG. 2 shows the embodiment according to FIG. 1 shown in a perspective view

FIG. 3 shows a variant of the invention, shown in cross section.

FIG. 4 shows a fitting with inserted tube and an annular part inserted into the retaining groove of the sealing ring before the pressing step.

DETAILED DESCRIPTION OF THE PREFERRED EMBODIMENTS

Figure 5:
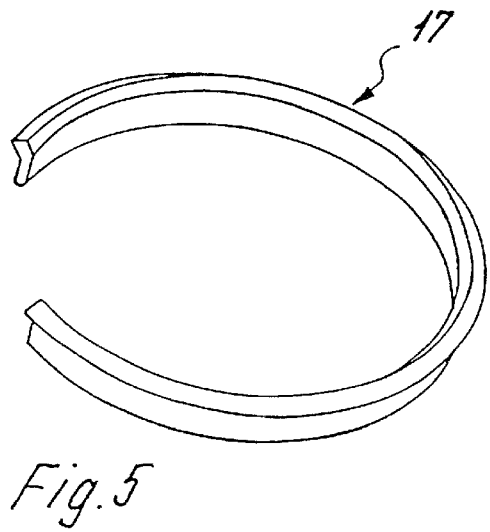
FIG. 5 shows an example of the rings for installation in the retaining groove of the sealing ring to lift the sealing ring off the inserted tube.

FIG. 1 shows a fitting 1 in cross section, which has a retaining section 2 for a tube 3 and is equipped with a retaining groove 4 for a sealing ring 5. The retaining groove 4 is formed on the interior of the fitting 1 in cooperation with a toroidal bulge 6 on the exterior of fitting 1.

According to FIG. 1, the retaining section 2 is bounded by a conically tapered part 7 which forms a contact surface for the tube 3.

A shaped part 8, preferably of plastic, is installed in the retaining section 2 and causes the sealing ring to clear the exterior surface of the tube 3. The introduction of the tube 3 into the retaining section 2 takes place only after insertion of the shaped part 8. This Will ensure that any sharp edges near the end of the tube cannot damage the sealing ring 5, if the tube 3 has not been properly deburred.

The structural design of the shaped part 8 is shown in FIGS. 1 and 2.

The shaped part 8 has an annular flange 10 protruding outwardly to engage the front surface 9 of the fitting 1, and annular segments 11 that extend outwardly from this flange 10. These annular segments 11 are equipped with an edge 12 extending into the groove 5 and engaging the sealing ring 5 and resting against the inner surface of the groove 4. A thin-walled tongue 13 extends from the edge 12 and passes no more than halfway under the sealing ring 5. The annular segments 11 rest against the inner surface of the retaining section 2 of the fitting and against the outer surface of the tube 3.

The fitting 1 is pressed against the tube 3 is using a pressing tool which compresses the fitting in the direction of arrows A and B in and around the toroidal bulge 6.

The part of the sealing ring 5 against the tongues 13 is pressed onto the outer surface of the tube 3 during the course of the pressing step, whereby a sufficient tightness is achieved between the aforementioned structural parts.

As shown in FIG. 3, the shaped part 14 has an outwardly extending annular flange 15 that rests against the end surface 9 of the fitting 1 after the insertion of the shaped part 14 into the retaining section 2 of the fitting 1. Stems 16 that extend from the annular flange engage the inner contour of the sealing ring 5. The stems 16 deform inwardly so that they protrude into the path of movement of the tube 3, which is installed into the retaining section 2 of the fitting. Thus the stems 16 and the sealing ring 5 are deformed radially outwardly when the tube 3 is inserted into the retaining section 2 of the fitting 1, which ensures that the tube 3 will not contact the sealing ring 5.

The stems 16 are braced against the sealing ring 5 in a region up to half the width of the ring. This will ensure that when pressing the fitting 1 together with the tube 3, a significant portion of the sealing ring 5 will be pressed directly against the outer wall of the tube 3, so that a sufficient tightness and seal will be achieved between the joined parts.

Figure 6:
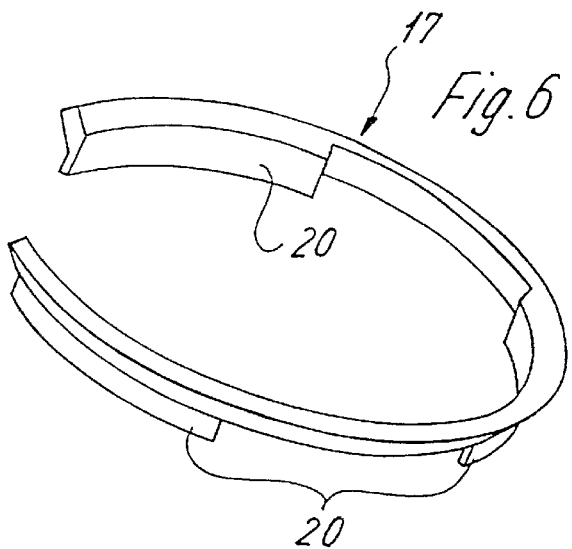
FIG. 6 shows another example of the rings for installation in the retaining groove of the sealing ring to lift the sealing ring off the inserted tube.

In the embodiments shown FIGS. 4 to 6, the shaped part that provides clearance between the sealing ring 5 and the metal tube 3 is formed as a split ring 17. This split ring 17 has a cross section with two legs 18, 19 that form an acute angle. One leg 19 passes under the sealing ring 5 up to about half the width of the ring 5. The other leg 18 engages the retaining groove 4.

As shown in FIG. 6, the leg 19 passing under the sealing ring 5 may be formed by annular segments 20.

Figure 7:
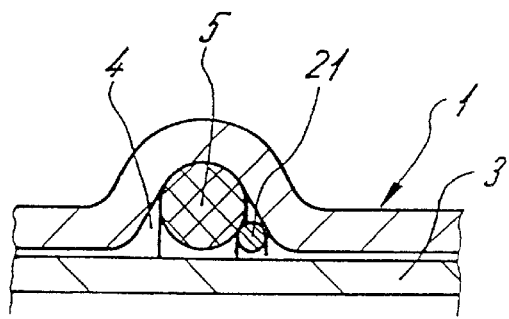
FIG. 7 shows an embodiment in which a clamping ring is supplied in the retaining groove for the sealing ring.
Figure 8:
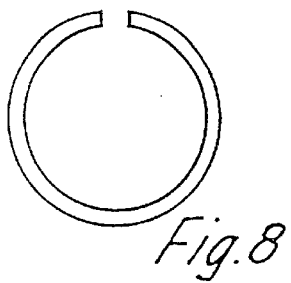
FIG. 8 shows a plan view of the clamping ring of FIG. 7.

In the embodiments shown in FIGS. 7 and 8, the shaped part that presses the sealing ring 5 into the retaining groove 4 and away from the region of movement of the tube 3 is a clamping ring 21. Specifically, FIGS. 7 and 8 show an O-ring. As shown in FIG. 8, the O-ring 21 may be split and is split at one location.

Figure 9:
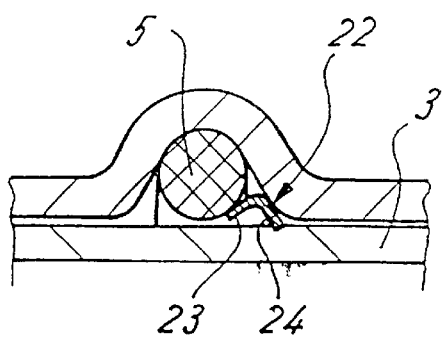
FIG. 9 shows a variant of the embodiment according to FIG. 7.

As is evident from FIG. 9, a split molded ring 22 which has an angular cross section can be used. One leg 23 is engages the sealing ring 5, whereas the other leg 24 extends into the insertion path of the tube 3, so that upon insertion of the tube 3, the molded ring 22 will be pressed outwardly with its leg 23 keeping the sealing ring 5 away from the tube 3 as it is inserted.

Figure 10:
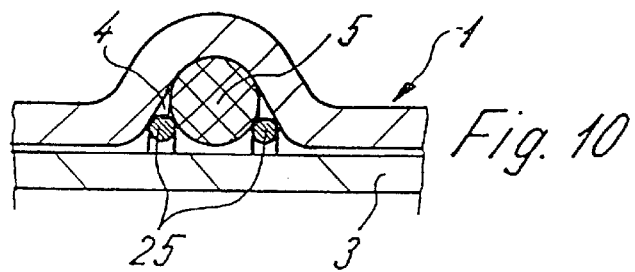
FIG. 10 shows a fitting with installed sealing ring and installed metal tubing shown in cross section, with one ring provided in the retaining groove on either side of the sealing ring, said rings pressing the sealing ring away from the tube.
Figure 11:
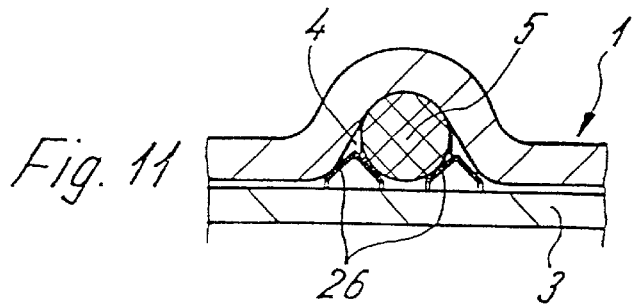
FIG. 11 shows an embodiment similar to FIG. 10, but where the rings assigned to the sealing ring are designed as molded rings.

From FIGS. 10 and 11 show split clamping rings 25 or split molded rings 26 can be installed in the retaining groove 4.

These rings 25 and 26 will be pushed to the side as the fitting 1 is pressed against the tube 3, so that the sealing ring 5 is pressed directly onto the outer surface of the tube 3.

Figure 12:
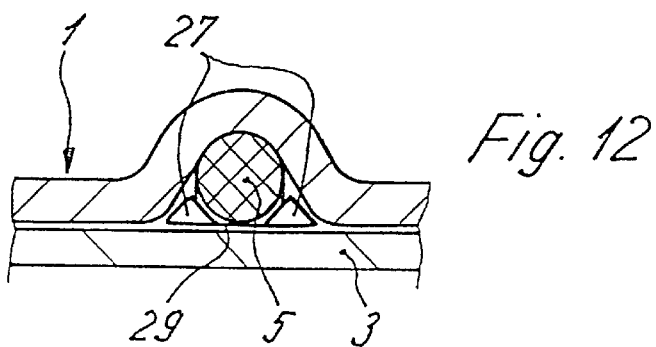
FIGS. 12 and 13 show examples of shaped parts that are inserted into the retaining groove and having two contact surfaces for the sealing ring, where these contact surfaces are joined together by a thin wall which forms a predetermined-break region during the pressing step.
Figure 13:
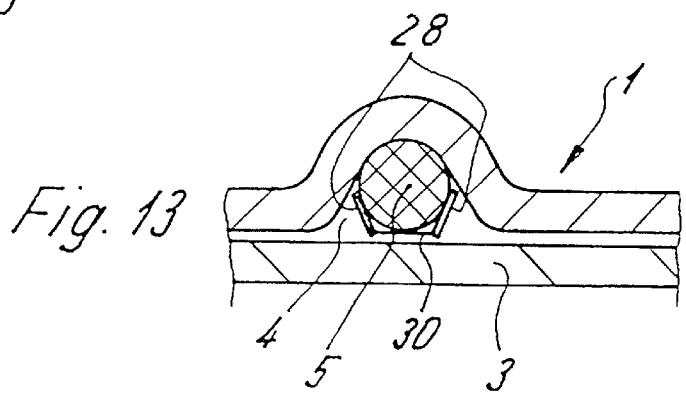

Shaped parts are illustrated in FIGS. 12 and 13 that are installed in the retaining groove 4 of the fitting 1 and have side contact surfaces 27 or 28 for the sealing ring 5. These contact surfaces are joined together by means of a thin wall 29, 30. These thin walls form predetermined-break regions during the pressing of the fitting with the tube 3. After the destruction of these thin walls, the sealing ring 5 can be pressed onto the outer surface of the tube 3, so that the desired tightness between the fitting and the inserted tube will be achieved.

Figure 14:
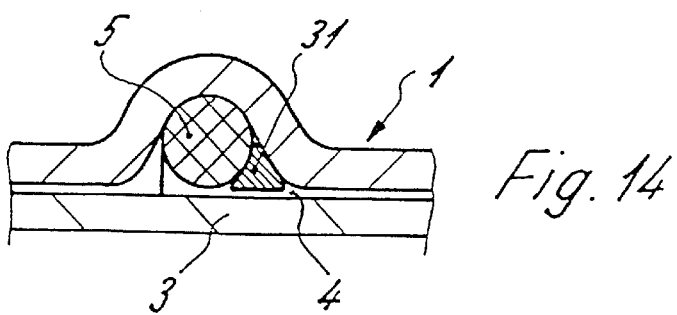
FIG. 14 shows a shaped part in the form of a wedge inserted into the retaining groove for the sealing ring, by which means the sealing ring clears the metal tube.

FIG. 14 shows that the shaped part used to provide clearance between the sealing ring 5 and the insertion path of the tube 3 can be designed as a wedge 31 in the form of a annular segment.

Figure 15:
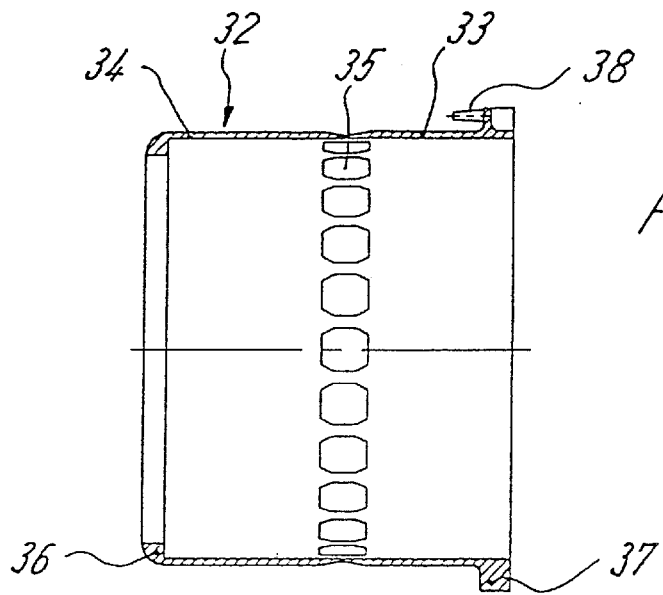
FIG. 15 shows a shaped part designed as casing and shown in cross section, which is equipped with a predetermined-break region whose width corresponds to the width of the sealing ring.
Figure 16:
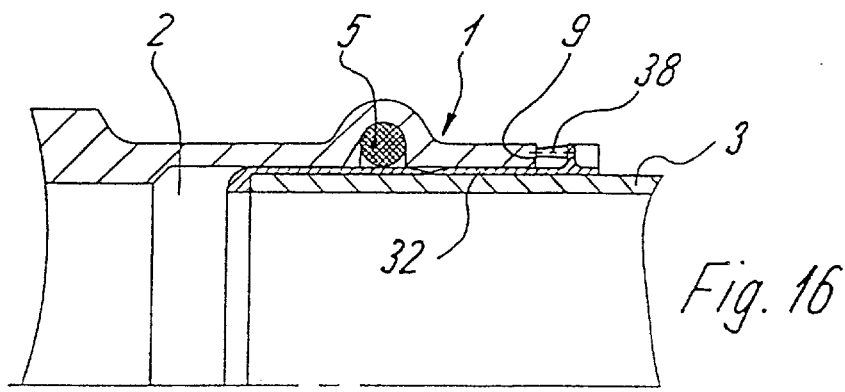
FIGS. 16 shows assembly steps for insertion of the tube into the retaining section by use of the casing shown FIG. 15.
Figure 17:
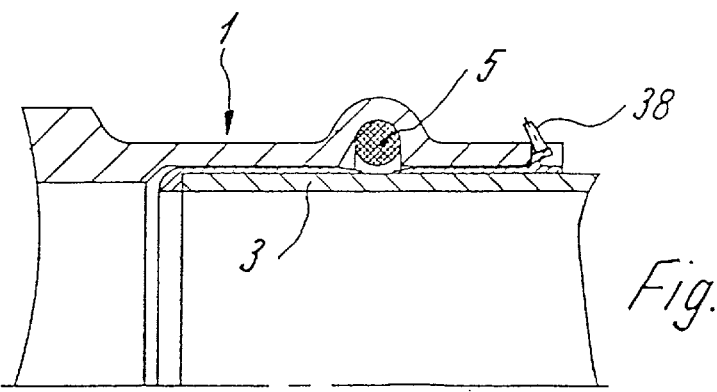
FIGS. 17 shows assembly steps for insertion of the tube into the retaining section by use of the casing shown FIG. 15.

In FIGS. 15 to 17, the shaped part is a casing 32 having casing parts 33 and 34 that are initially joined together via a predetermined-break region 35. The width of the predetermined-break region corresponds to the width of the sealing ring 5.

The casing 32 is equipped at the front end with an inwardly protruding annular flange 36, which will engage the end surface of the tube 3 once the tube 3 has been fully inserted into the casing 32. Next, the tube 3 with casing 32 is installed into the retaining section 2 of the fitting 1. At the rear end of the casing there is an outwardly protruding annular flange 37 equipped with a pin 38 at the side facing the fitting.

The first assembly step is illustrated in FIG. 16, which shows the casing 32 together with the tube 3 partially installed into the retaining section 2 of the fitting 1 that the pin 38 rests against the front surface 9 of the fitting 1. At the end of this assembly movement, the casing 32 is still in the one-piece form shown in FIG. 15. When the insertion movement of the tube 3 is continued the casing 32 separates at the predetermined-break region 35, so that subsequently the casing part 34 together with the tube is moved into the end position illustrated in FIG. 17.

After the separation at the predetermined-break region 35, the pin 38 moves upward, as shown in FIG. 17. This position shows the assembler that the casing 32 is separated in the region of the set break position.

This separation creates a clearance in the region of the casing 32 for the sealing ring 5, so that when the fitting 1 is compressed, the sealing ring 5 compresses directly against the outer surface of the tube 3. Thus the required tightness and seal between the parts will be achieved.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of creating a compression coupling between a fitting and a tube, the fitting having a retaining region adjacent an end portion of the fitting, the retaining region having an interior-oriented annular groove cooperatively formed with an exterior-oriented annular bulge on the retaining region, the tube having an end formed to fit into the retaining region of the fitting, comprising the steps of:

positioning a sealing ring in the groove;

inserting a shaped part into the fitting to engage and radially outwardly deform the sealing ring to provide clearance between the sealing ring and the tube is installed into the fitting;

installing the tube into the fitting; and, pressing the retaining region into the tube so that the sealing ring is pressed onto the tube with the shaped part between the fitting and the tube.

2. The method according to claim 1, wherein the shaped part comprises at least one of rings, annular segments, casing, wedges, or stems.

3. The method according to claim 1, further comprising the step of providing a shaped part that enters the groove to engage a middle region of the sealing ring, and radially outwardly deform the sealing ring to provide a clearance for the tube during the installing step.

4. The method according to claim 1, wherein the step of pressing the retaining region is performed such that the sealing ring elastically deforms during pressing such that approximately half of the sealing ring engages an exterior surface of the tube.

5. The method according to claim 1, wherein the shaped part is a casing formed to fit around the end of the tube and define a hollow interior and provided with an inwardly-extending flange adjacent a first end and an outwardly-extending flange adjacent a second end, a predetermined annular breaking region therebetween, and further comprising the steps of:

inserting the end of the tube into the second end of the casing and the first end of casing into the fitting until the inwardly-extending flange engages an end of the tube and the outwardly extending flange engages and end of the fitting; and, breaking the casing into two parts at the breaking region aligned with the sealing ring to form a separation by continued insertion.

6. The method according to claim 5, wherein the breaking region has a width that corresponds to the width of the sealing ring, and the sealing ring is pressed along all or part of entire width of the breaking region.

7. The method according to claim 5, wherein the casing comprises two casing parts joined together by the predetermined break region, whose width corresponds to the width of the sealing ring.

8. The method according to claim 7, wherein the casing further comprises an outwardly protruding annular flange formed to engage an end of the fitting upon completion of the installing step.

9. The method according to claim 8, wherein the outwardly protruding annular flange comprises an axially-oriented pin formed to engage the end of the fitting during the installing step and when the predetermined break region fails, the pin bending radially outward upon completion of the installing step.

10. The method according to claim 1, wherein the shaped part is braced against a part of an inner contour of the sealing ring and extends into a path of movement of the inserted tube, and upon insertion of the tube, the sealing ring is moved from the path of movement of the tube.

11. The method according to claim 1, wherein the shaped part comprises:
a ring-shaped annular flange formed to engage a front surface of the fitting;
at least one segment extending inwardly from the annular flange, each segment comprising a raised edge adjacent a distal end of the segment, and a thin-walled tongue emanating from each raised edge; wherein
during the insertion step, each raised edge engages a surface of the retaining region, and the thin-walled tongues extending approximately half-way past the sealing ring, thereby radially outwardly deforming the sealing ring into the groove.

12. The method according to claim 11, wherein each segment simultaneously engages the interior of the fitting region and the exterior of the tube.

13. The method according to claim 1, wherein the shaping part comprises:
a ring-shaped annular flange formed to engage a front surface of the fitting;
a least one stem formed so that an end of the stem engages an inner contour of the sealing ring during the inserting step and the stem and the sealing ring cooperate to deform the sealing ring radially outwardly and into the groove in the installing step.

14. The method according to claim 1, wherein the shaped part comprises a split ring having two legs, which in cross-section form an acute angle, wherein a first leg engages an inner contour of the retaining ring, and a second leg passes between the retaining ring and the groove.

15. The method according to claim 14, wherein the second leg comprises annular segments.

16. The method according to claim 1, wherein the shaped part is a split clamping ring formed to be installed within the groove and press the sealing ring outwardly and into the groove, thereby creating a clearance between the fitting interior and the sealing ring.

17. The method according to claim 1, wherein the shaped part is a split molded ring with an angular-shaped cross-section having a first leg braced against the sealing ring and a second leg extending into an interior of the retaining region during the insertion step, the second leg elastically deforming during the installing step.

18. The method according to claim 1, wherein the inserting step further comprises the step of inserting split rings within the groove so as to be positioned around the sealing ring.

19. The method according to claim 1, wherein the shaped part has a predetermined break region defined by a thin, annular wall, the break region forming side contact surfaces to engage the sealing ring as the sealing ring deforms the pressing step.

* * * * *